(12) United States Patent
Moreno Castro

(10) Patent No.: US 11,345,291 B2
(45) Date of Patent: May 31, 2022

(54) SLIDING TOOL ASSEMBLY FOR A VEHICLE

(71) Applicant: Nissan North America, Inc., Franklin, TN (US)

(72) Inventor: Rafael Moreno Castro, Toluca (MX)

(73) Assignee: NISSAN NORTH AMERICA, INC., Franklin, TN (US)

(*) Notice: Subject to any disclaimer, the term of this patent is extended or adjusted under 35 U.S.C. 154(b) by 0 days.

(21) Appl. No.: 16/365,292

(22) Filed: Mar. 26, 2019

(65) Prior Publication Data

US 2020/0307468 A1 Oct. 1, 2020

(51) Int. Cl.

| | |
|---|---|
| *B60R 11/06* | (2006.01) |
| *B60P 1/54* | (2006.01) |
| *B60R 16/03* | (2006.01) |
| *B60Q 1/24* | (2006.01) |
| *B60R 11/00* | (2006.01) |

(52) U.S. Cl.
CPC ............ *B60R 11/06* (2013.01); *B60P 1/5457* (2013.01); *B60P 1/5485* (2013.01); *B60Q 1/24* (2013.01); *B60R 16/03* (2013.01); *B60R 2011/004* (2013.01); *B60R 2011/0084* (2013.01)

(58) Field of Classification Search
CPC . B60R 11/06; B60R 16/03; B60R 2011/0084; B60R 2011/004; B60R 3/02; B60R 9/06; B60P 1/5485; B60P 1/5457; B60Q 1/24; B62D 33/03; B62D 33/0273
USPC ......... 248/274.1, 176.3, 178.1, 284.1, 183.1, 248/183.3, 179.1, 181.1, 181.2, 184.1, 248/183.2, 278.3, 279.1, 285.1, 287.1, 248/298.1, 136; 296/3
See application file for complete search history.

(56) References Cited

U.S. PATENT DOCUMENTS

| | | | | |
|---|---|---|---|---|
| 3,561,716 A | * | 2/1971 | Thompson | G10D 13/02 248/286.1 |
| 4,556,358 A | | 12/1985 | Harlan | |
| 4,710,090 A | | 12/1987 | DeLuca et al. | |
| 4,760,986 A | * | 8/1988 | Harrison | B60P 7/08 248/231.61 |
| 5,035,464 A | * | 7/1991 | Spallholtz | A47C 7/70 297/144 |
| 5,088,636 A | * | 2/1992 | Barajas | B60R 11/06 224/281 |
| 5,494,327 A | * | 2/1996 | Derecktor | B60P 3/40 224/321 |
| 5,630,566 A | * | 5/1997 | Case | A47B 23/046 248/122.1 |
| 5,921,603 A | * | 7/1999 | Karrer | B60P 1/54 296/100.17 |

(Continued)

FOREIGN PATENT DOCUMENTS

JP 2001073474 A * 3/2001

*Primary Examiner* — Kimberly T Wood
(74) *Attorney, Agent, or Firm* — Global IP Counselors, LLP

(57) ABSTRACT

A sliding tool assembly for a vehicle includes a sliding member configured to be slidably connected to a first accessory track of a vehicle. A base member is rotatably connected to the sliding member and rotatable about a first rotation axis. A first beam member is rotatably connected to the base member and rotatable about a second rotation axis. A second beam member is rotatably connected to the first beam member and rotatable about a third rotation axis.

18 Claims, 9 Drawing Sheets

(56) References Cited

U.S. PATENT DOCUMENTS

| | | | |
|---|---|---|---|
| 6,264,083 B1* | 7/2001 | Pavlick | B60R 9/00 224/281 |
| 6,375,259 B1* | 4/2002 | Ma | A47C 7/72 297/154 |
| 6,712,568 B2 | 3/2004 | Snyder et al. | |
| 7,500,646 B2* | 3/2009 | Chapman | F16M 11/14 248/279.1 |
| 7,874,774 B2* | 1/2011 | Peterson | B60P 7/0815 410/104 |
| 8,054,388 B2* | 11/2011 | Hurd | F16M 11/10 248/183.1 |
| 8,302,228 B2* | 11/2012 | Aboujaoude | A61G 13/1245 5/648 |
| 8,348,331 B2* | 1/2013 | Holt | B60P 7/0815 224/403 |
| 9,302,719 B1* | 4/2016 | Krishnan | B62D 33/0273 |
| 9,471,113 B2* | 10/2016 | Fan | G06F 1/185 |
| 9,527,456 B2* | 12/2016 | Ackeret | B60N 3/002 |
| 9,623,787 B2 | 4/2017 | Sterling | |
| 9,783,120 B2* | 10/2017 | Lungershausen | B60R 9/10 |
| 9,889,782 B2* | 2/2018 | Gobart | B60N 3/02 |
| 10,160,397 B1* | 12/2018 | Zlojutro | B60R 9/06 |
| 10,343,778 B2* | 7/2019 | Peuziat | F16M 13/02 |
| 10,471,902 B2* | 11/2019 | Fischer | F16M 11/2092 |
| 10,513,227 B2* | 12/2019 | Merino | B60R 9/10 |
| 10,703,286 B2* | 7/2020 | Patterson | B62D 33/03 |
| 2002/0164225 A1* | 11/2002 | Snyder | B60P 7/0815 410/104 |
| 2003/0007855 A1 | 1/2003 | van der Horn | |
| 2004/0178312 A1* | 9/2004 | Parsons | A61B 90/30 248/276.1 |
| 2006/0133916 A1 | 6/2006 | Wood | |
| 2007/0110539 A1* | 5/2007 | Klinkman | B60P 7/15 410/150 |
| 2008/0143133 A1* | 6/2008 | Nichols | B60P 7/0815 296/3 |
| 2009/0201689 A1* | 8/2009 | Nolle | B60Q 1/24 362/485 |
| 2012/0006870 A1* | 1/2012 | Proctor | B60R 11/02 224/275 |
| 2012/0305612 A1* | 12/2012 | Bell, Jr. | B60R 9/06 224/519 |
| 2013/0112841 A1* | 5/2013 | Fan | F16M 11/105 248/622 |
| 2014/0160776 A1* | 6/2014 | Sura | B60Q 3/30 362/485 |
| 2018/0065560 A1* | 3/2018 | Krishnan | B60R 3/02 |
| 2018/0086275 A1* | 3/2018 | Krishnan | B60J 7/106 |
| 2018/0099601 A1 | 4/2018 | Martinez Romero et al. | |
| 2018/0111563 A1* | 4/2018 | Leff Yaffe | B60R 9/06 |
| 2019/0256004 A1* | 8/2019 | Patterson | B60R 3/02 |

* cited by examiner

SLIDING TOOL ASSEMBLY FOR A VEHICLE

BACKGROUND

Field of the Invention

The present invention generally relates to a sliding tool assembly for a vehicle. More specifically, the present invention relates to tool assembly slidable along an accessory track of a vehicle and rotatable about a plurality of rotation axes.

Background Information

An accessory track system including an accessory track is commonly used in a vehicle. A need exists for a tool assembly that slidably engages the accessory track of the vehicle.

SUMMARY

An object of the disclosure is to provide a sliding tool assembly for a vehicle.

In view of the state of the known technology, one aspect of the present disclosure is to provide a sliding tool assembly for a vehicle including a sliding member configured to be slidably connected to a first accessory track of a vehicle. A base member is rotatably connected to the sliding member and rotatable about a first rotation axis. A first beam member is rotatably connected to the base member and rotatable about a second rotation axis. A second beam member is rotatably connected to the first beam member and rotatable about a third rotation axis.

Another aspect of the present invention includes a sliding tool assembly for a vehicle having a body structure. A first accessory track is disposed in the vehicle body structure. A sliding member is slidably connected to the first accessory track. A base member is rotatably connected to the sliding member and rotatable about a first rotation axis. A first beam member is rotatably connected to the base member and rotatable about a second rotation axis. A second beam member is rotatably connected to the first beam member and rotatable about a third rotation axis.

Also other objects, features, aspects and advantages of the disclosed vehicle door assembly will become apparent to those skilled in the art from the following detailed description, which, taken in conjunction with the annexed drawings, discloses exemplary embodiments of the sliding tool assembly for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
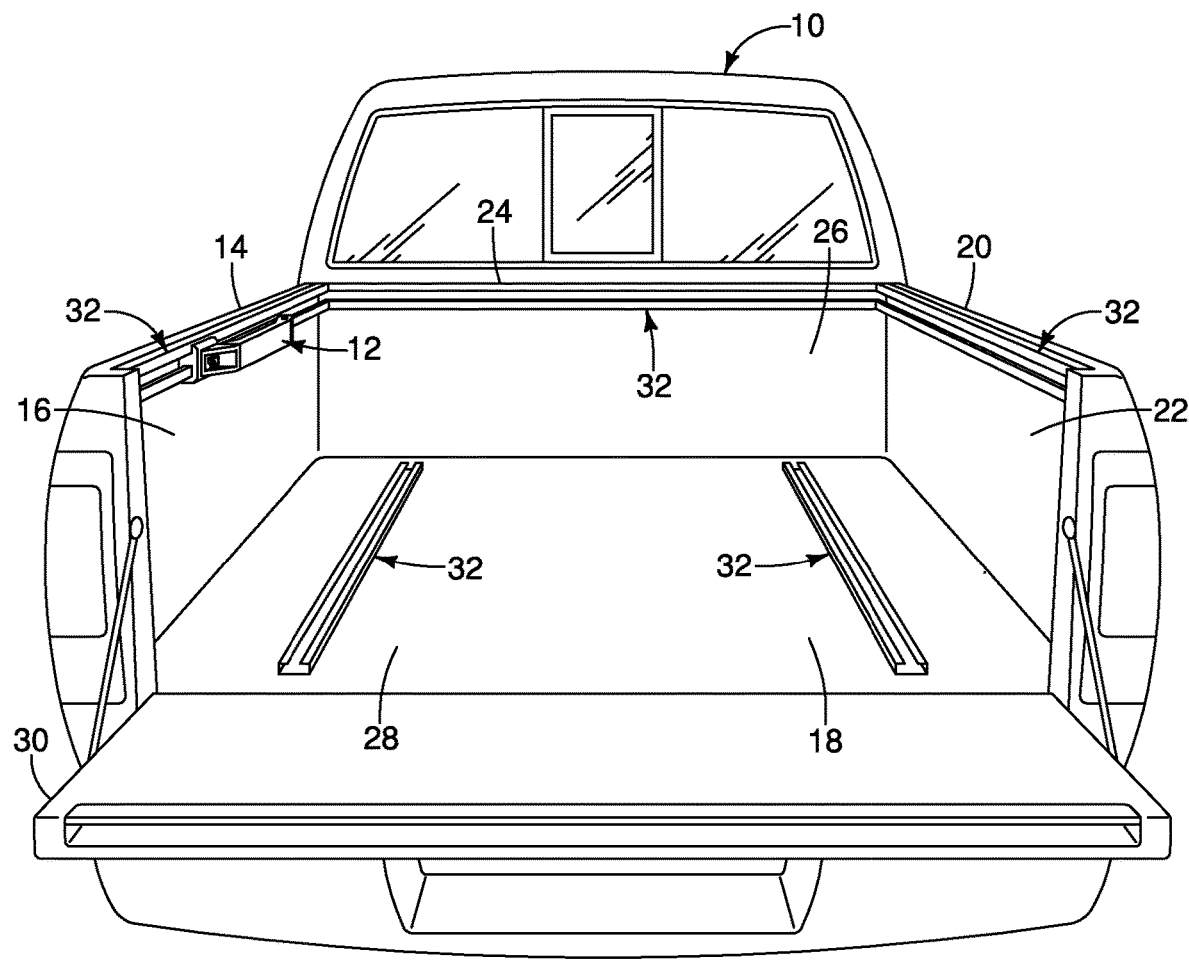
FIG. 1 is a perspective view of a vehicle including sliding tool assembly in accordance with an exemplary embodiment of the present invention.
Figure 2:
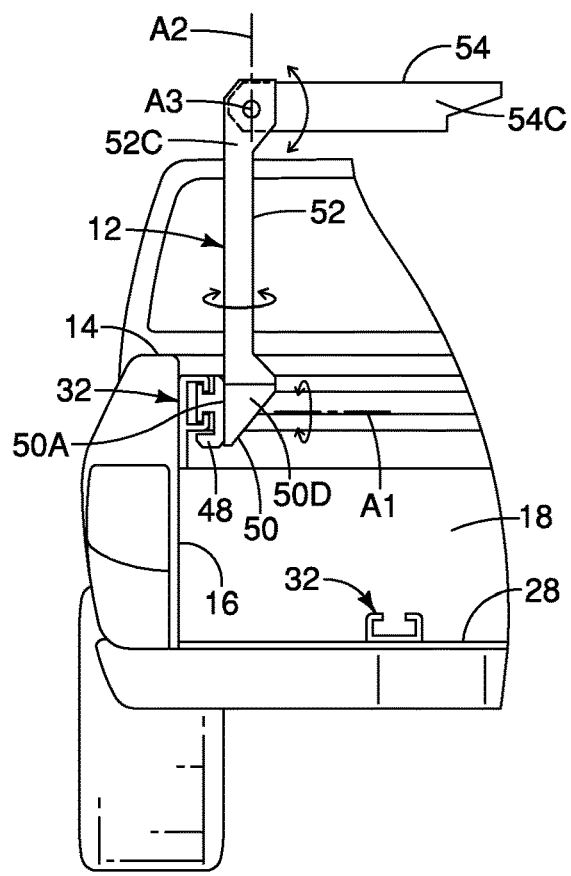
FIG. 2 is a rear elevational view of the vehicle of FIG. 1 in which the sliding tool assembly is disposed in an expanded position.

Referring initially to FIGS. 1 and 2, a vehicle 10 that includes a sliding tool assembly 12 is illustrated in accordance with an exemplary embodiment of the present invention.

Figure 3:
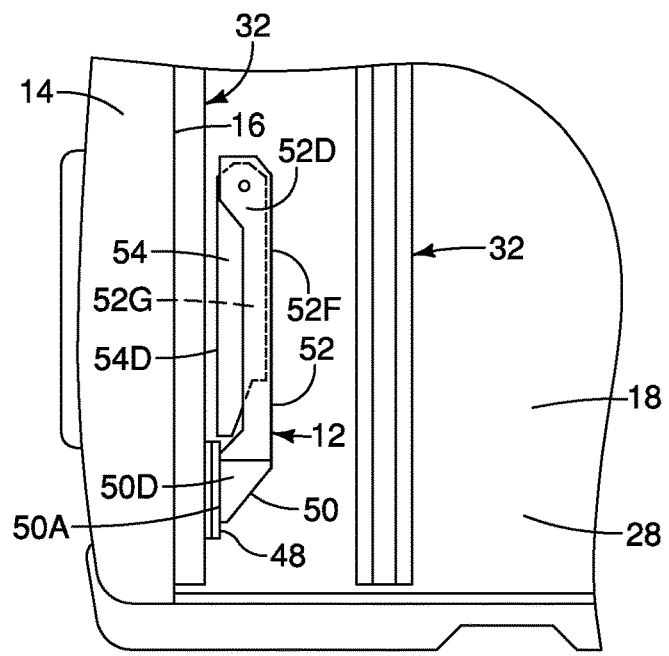
FIG. 3 is a top plan view of the vehicle of FIG. 1 in which the sliding tool assembly is disposed in a collapsed position.

As shown in FIGS. 1 to 3, the vehicle 10 has a body structure including a first side wall structure 14 having an inboard facing surface 16 facing a cargo area 18, a second side wall structure 20 having an inboard facing surface 22 facing the cargo area, and a front wall structure 24 having a rearward facing surface 26 facing the cargo area 18. The cargo area 18 includes a floor, or lower wall structure, 28, with the inboard facing surfaces 16, 22 and 26 extending upward from the floor 28 and being approximately perpendicular to the floor 28. A tail gate 30 is movably connected to the vehicle 10 between an open position (FIG. 1) and a closed position in which the tail gate 30 is substantially parallel to the front wall structure 24. The first side wall structure 14, the second side wall structure 20, the front wall structure 24 and the tail gate 30 define the cargo area 18. In the exemplary embodiment, the vehicle 10 is a pickup truck. However, it should be understood from the drawings and the description herein that the vehicle 10 can be any vehicle that includes a cargo area 18, such as a semi-trailer truck, a cargo van, or other similar vehicle. Further, in the exemplary embodiment, the cargo area 18 has an open upper end.

In the exemplary embodiment, the vehicle 10 includes a plurality of accessory tracks 30. As shown in FIG. 1, one accessory track 32 is connected to each of the first side wall structure 14, the second side wall structure 20, and the front wall structure 24. The accessory tracks 32 connected to the front and side wall structures 24, 14 and 20 are shown as being connected proximate an upper end of the wall structures, although the accessory tracks 32 can be connected at any suitable height along the wall structures. Additionally, as shown in FIG. 1, an accessory track 28 can be disposed on the floor 28 of the cargo area 18. Five accessory tracks 32 are disposed in the cargo area 18, as shown in FIG. 1, one on each of the front and side wall structures 24, 14 and 20, and two on the floor 28. The two floor accessory tracks 32 are preferably substantially parallel. Each of the accessory tracks 32 is substantially identical. Therefore, the description of one accessory attachment track 32 applies to all.

Figure 16:
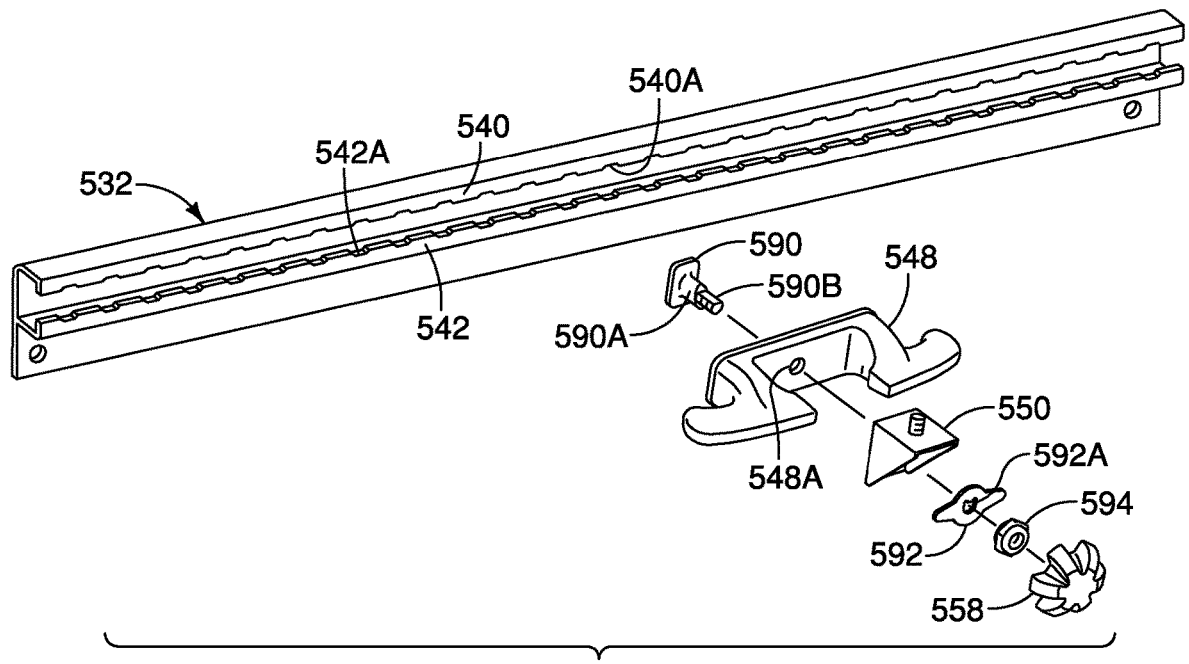
FIG. 16 is an exploded perspective view of a modified base member of the sliding tool assembly of FIG. 1.

The accessory track 32 is fastened or otherwise rigidly attached to the inboard facing surface 16 of the first side wall structure 14, as shown in FIG. 1. The accessory track 32 is an elongated member that includes an upper wall 34, a lower wall 36 and a flange portion 38, as shown in FIGS. 1-5. The upper and lower walls 34 and 36 extend outwardly from the flange portion 38. Preferably, the upper and lower walls 34 and 36 are substantially parallel. An upper outer wall 40 extends downwardly from an end of the upper wall 34. A lower outer wall 42 extends upwardly from an end of the lower wall 36 toward the upper outer wall 40. The upper outer wall 40 and the lower outer wall 42 are preferably substantially parallel. A plurality of upper recesses can be formed in the upper outer wall 40 and a plurality of lower recesses can be formed in the lower outer wall 42, as shown in FIG. 16. An elongated slot 44 is defined between the upper outer wall 40 and the lower outer wall 42. The slot 44 has a width W1, as shown in FIG. 5. The upper and lower walls 34 and 36, the upper and lower outer walls 40 and 42, and the flange portion 38 define a substantially hollow interior 46 of the accessory track 32. The upper and lower walls 34 and 36, the upper and lower outer walls 40 and 42, the slot 44 and the flange portion 38 preferably extend the entire length of the accessory track 32.

Figure 4:
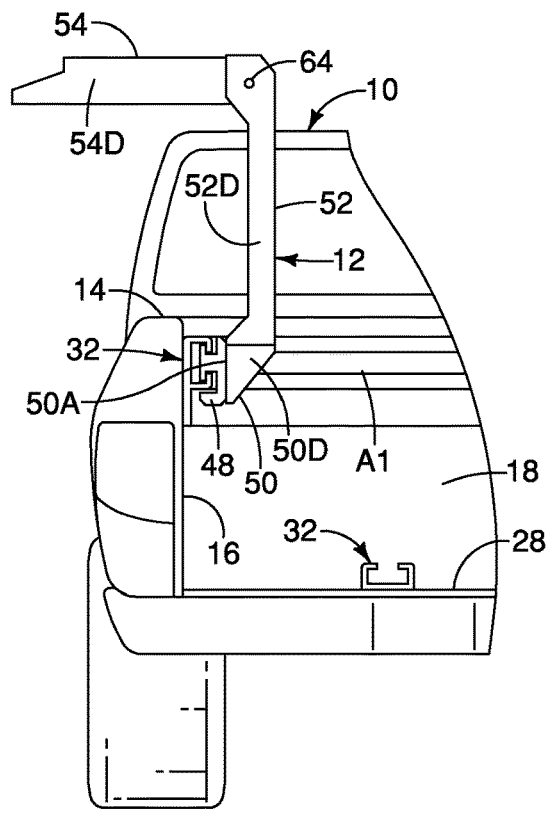
FIG. 4 is a rear elevational view of the vehicle of FIG. 1 in which the sliding tool assembly is disposed in another expanded position.
Figure 5:
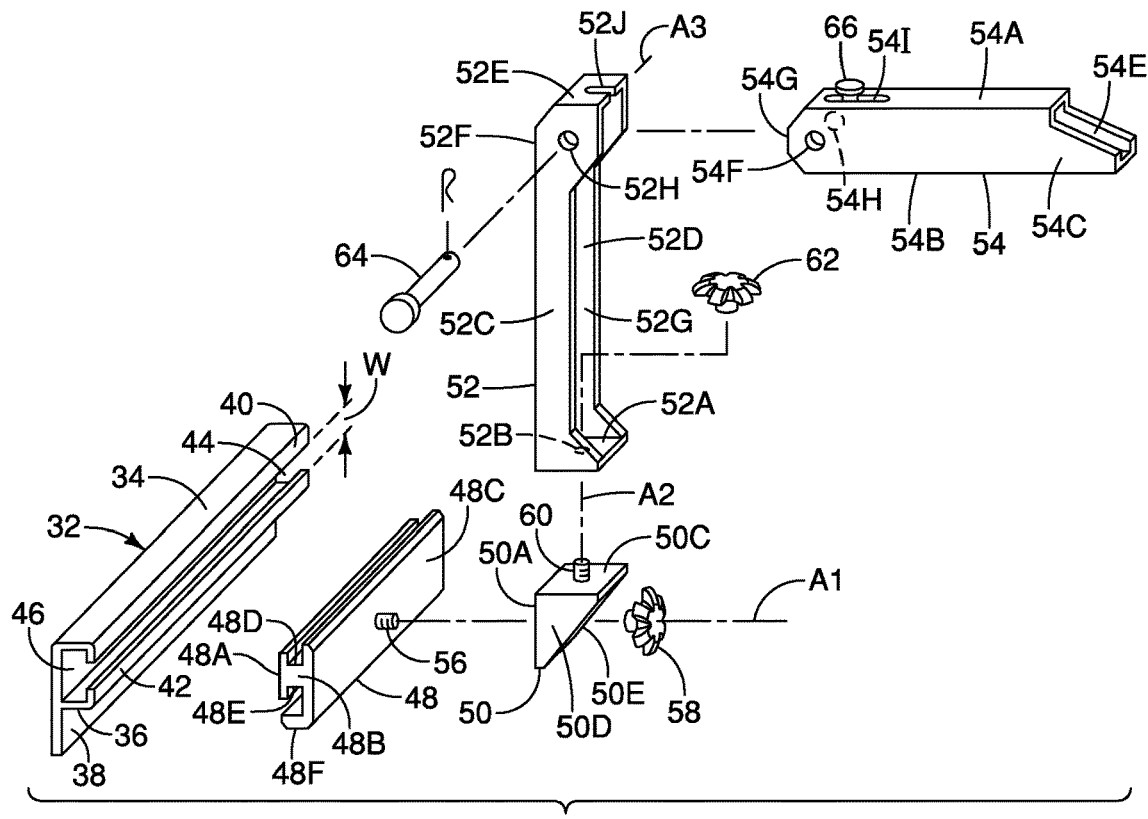
FIG. 5 is an exploded perspective view of the sliding tool assembly of FIG. 1.

The flange portion 38 of the accessory track 32 is fixed to the inboard facing surface 16 of the first side wall structure 14 at a location spaced apart from and above the floor 18, as shown in FIGS. 1, 2 and 4. In the exemplary embodiment, the accessory track 32 is fastened to the inboard facing surface 16 proximate an upper edge of the first side wall structure 14. As shown in FIG. 1, a plurality of accessory tracks 32 are installed in the cargo area 18 of the vehicle 10. For example, in the exemplary embodiment, an accessory track 32 is connected to each of the first side wall structure 14, the second side wall structure 20 and the front wall structure 24 of the cargo area 18.

The sliding tool assembly 12, as shown in FIGS. 1-7, includes a sliding member 48 configured to be slidably connected to the accessory track 32 of the vehicle 10, a base member 50 rotatably connected to the sliding member 48, a first beam member 52 rotatably connected to the base member 50, and a second beam member 54 rotatably connected to the first beam member 52. As shown in FIGS. 3 and 5, the base member 48 is rotatable about a first rotation axis A1, the first beam member 52 is rotatable about a second rotation axis A2, and the second beam member is rotatable about a third rotation axis A3. As shown in FIGS. 3 and 5, the first axis A1, the second axis A2 and the third axis A3 are preferably different axes. The first rotation axis A1 is preferably substantially perpendicular to the second rotation axis A2. The third rotation axis A3 is preferably substantially perpendicular to the second rotation axis A2. The first rotation axis A2 is preferably substantially perpendicular to the third rotation axis A3.

The sliding member 48 is slidably connected to one of the accessory tracks 32 of the vehicle 10, such as the first accessory track 32 connected to the first side wall structure 14 as shown in FIGS. 1-5. The sliding member 48 includes an engagement portion 48A configured to engage the accessory track 32. The engagement portion 48A is received by the hollow interior 46 of the accessory track 32. A connecting portion 48B connects the engagement portion 48A to a base portion 48C of the sliding member 48. The connecting portion 48B is disposed in the slot 44 of the accessory track 32. An upper channel 48D and a lower channel 48E are disposed between the engagement portion 48A and the base portion 48C of the sliding member 48 to receive the upper outer wall 40 and the lower outer wall 42, respectively. A support portion 48F is connected to a lower end of the base portion 48C and is disposed beneath the lower wall 36 of the accessory track 32 when the sliding member 48 is connected to the accessory track 32. The sliding member 48 is preferably unitarily formed as a one-piece member. The sliding member can be made of any suitable material, such as steel.

A first pin 56 extends outwardly from the base portion 48C of the sliding member 48. The first pin 56 is preferably disposed on an opposite side of the base portion 48C to which the connecting portion 48B is connected. The first pin 56 can be unitarily formed with the sliding member 48 as a one-piece member. Alternatively, the first pin 56 can be connected to the sliding member 48 by any suitable method, such as by welding.

Figure 10:
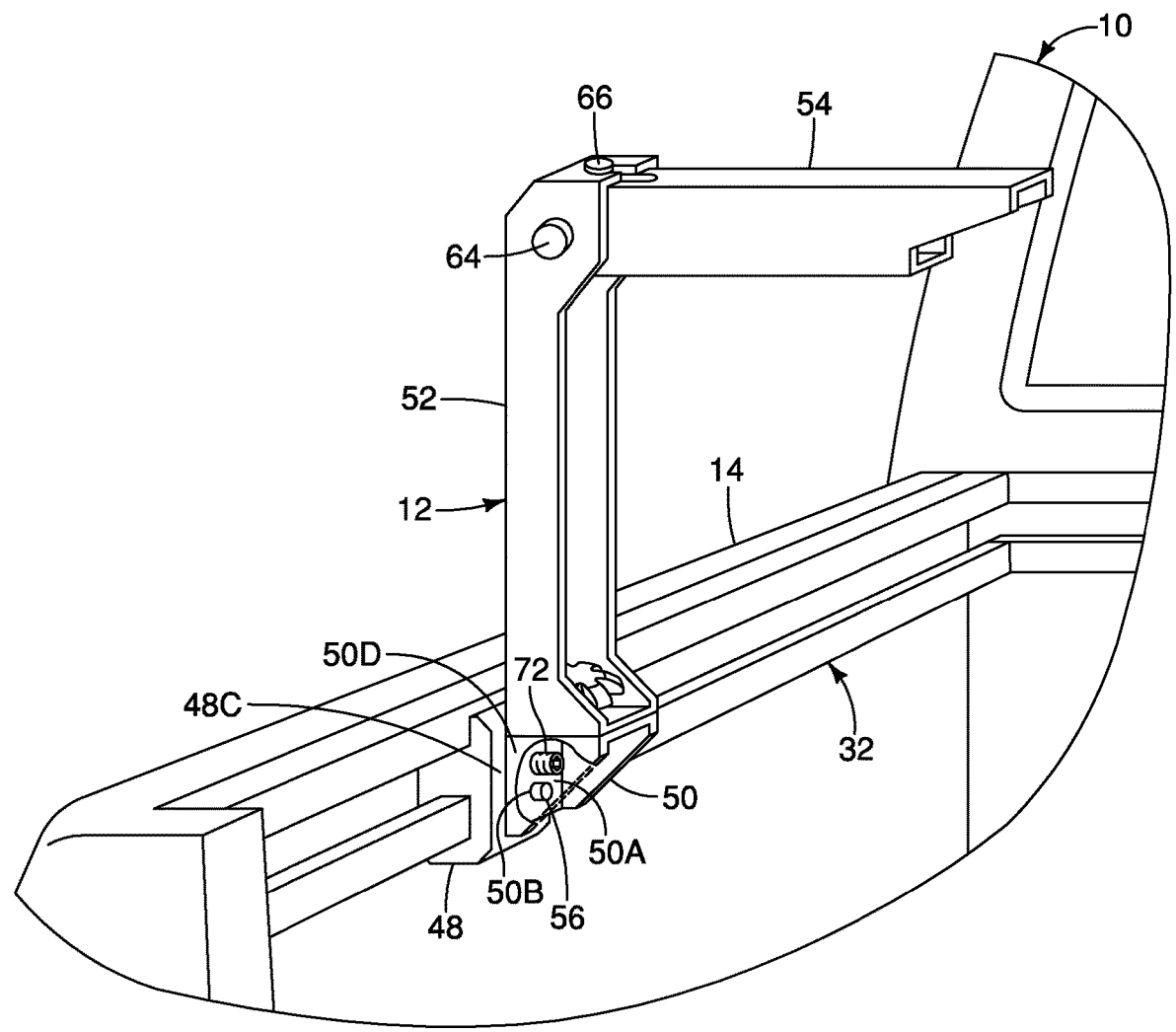
FIG. 10 is a perspective view of the sliding tool assembly of FIG. 1 including a locking member to secure the sliding tool assembly to an accessory track.

The base member 50 is rotatably connected to the sliding member 48, as shown in FIGS. 1-5. The base member 50 has a rear wall 50A (FIG. 10) having a pin receiving opening 50B (FIG. 10). The pin receiving opening 50B receives the first pin 56 such that the rear wall 50A contacts the base portion 48C of the sliding member 48, as shown in FIGS. 2-4. The base member 50 is rotatable about the first pin 56, such that the first pin 56 defines the first rotation axis A1. The base member 50 is rotatable 360 degrees about the first pin 56. As shown in FIG. 5, the first pin 56 can have a threaded portion that receives a first tightening member 58 to secure the base member 50 to the sliding member 48 to prevent rotation of the base member 50 relative to the sliding member 48. Any suitable method can be used to prevent rotation of the base member 50 with respect to the sliding member 48 when the base member 50 is disposed in a desired position.

An upper wall 50C extends outwardly from the rear wall 50A of the base member 50, as shown in FIGS. 2-5. First and second side walls 50D and 50E extend outwardly from the rear wall 50A. Upper ends of the first and second side walls 50D and 50E are connected to opposite sides of the upper wall 50C. The rear wall 50A, the upper wall 50C and the side walls 50D and 50E define a cavity 50F in the base member 50. A free end of the first pin 56 is disposed in the cavity 50F when the base member 50 is connected to the sliding member 48. The cavity 50F provides access to the first pin 56, such as with the first tightening member 58.

A second pin 60 extends outwardly from the upper wall 50C of the base member 50. The second pin 60 can be unitarily formed with the base member 50 as a one-piece member. Alternatively, the second pin 60 can be connected to the base member 50 by any suitable method, such as by welding.

The first beam member 52 is rotatably connected to the base member 50, as shown in FIGS. 1-5. The first beam member has a lower wall 52A having a pin receiving opening 52B that receives the second pin 60, as shown in FIGS. 1-5. First and second side walls 52C and 52D extend from the lower wall 52A to an upper wall 52E. A rear wall 52F extends from the lower wall 52A to the upper wall 52E between the first and second side walls 52C and 52D. A cavity, or receiving area, 52G in the first beam member 52 is defined by the lower wall, 52A, the first and second side walls 52C and 52D, the rear wall 52F and the upper wall 52E. The cavity 52G is configured to receive the second beam member 54 to facilitate collapsing the sliding tool assembly 12 for storage, as shown in FIGS. 1 and 3. A first opening 52H extends completely through the first side wall 52C proximate the upper wall 52E. A second opening 52I (FIGS. 6 and 7) extends completely through the second side wall 52D proximate the upper wall 52E and aligned with the first opening 52H. A notch 52J extends rearwardly from a front edge 52K of the upper wall 52E, as shown in FIGS. 5-7.

The first beam member 52 is rotatably connected to the base member 50, as shown in FIGS. 1-5. The pin receiving opening 52B receives the second pin 60 such that the lower wall 52A contacts the upper wall 50C of the base member 50, as shown in FIGS. 2-5. The first beam member 52 is rotatable about the second pin 60, such that the second pin 60 defines the second rotation axis A2. The first beam member 52 is rotatable 360 degrees about the second pin 60. As shown in FIG. 5, the second pin 60 can have a threaded portion that receives a second tightening member 62 to secure the first beam member 52 to the base member 50 to prevent rotation of the first beam member 52 relative to the base member 50. Any suitable method can be used to prevent rotation of the first beam member 52 relative to the base member 50 when the first beam member 52 is disposed in a desired position. A free end of the second pin 60 is disposed in the cavity 52G when the first beam member 52 is connected to the base member 50. The cavity 52G provides access to the second pin 56, such as with the second tightening member 62.

The second beam member 54 has opposing upper and lower walls 54A and 54B, respectively, and opposing first and second side walls 54C and 54D, respectively, as shown in FIGS. 1-7. The upper wall 54A, the lower wall 54B and the first and second side walls 54C and 54D define a cavity 54 within the second beam member 54. A first opening 54F extends completely through the first side wall 54C proximate a rear end 54G of the second beam member 54. A second opening 54H extends completely through the second side wall 54D proximate the rear end 54G of the second beam member and aligned with the first opening 54F. A slot 54I extends completely through the upper wall 54A proximate the rear end 54G of the second beam member 54.

Figure 6:
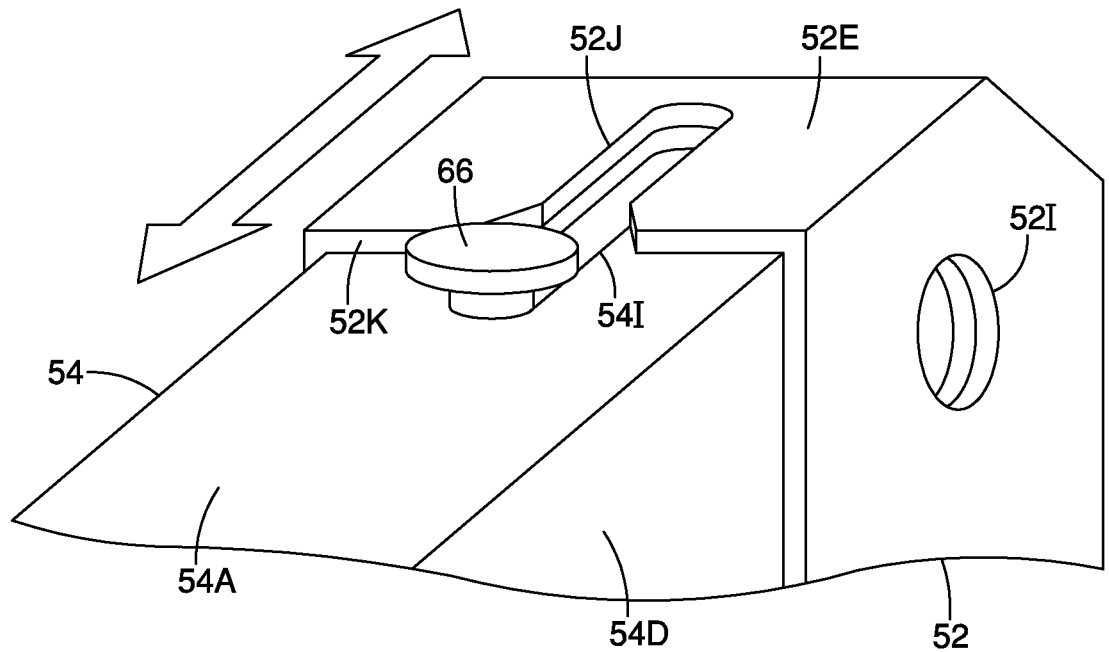
FIG. 6 is a perspective view of a locking member in an unlocked position such that the second beam member is not locked to the first beam member.
Figure 7:
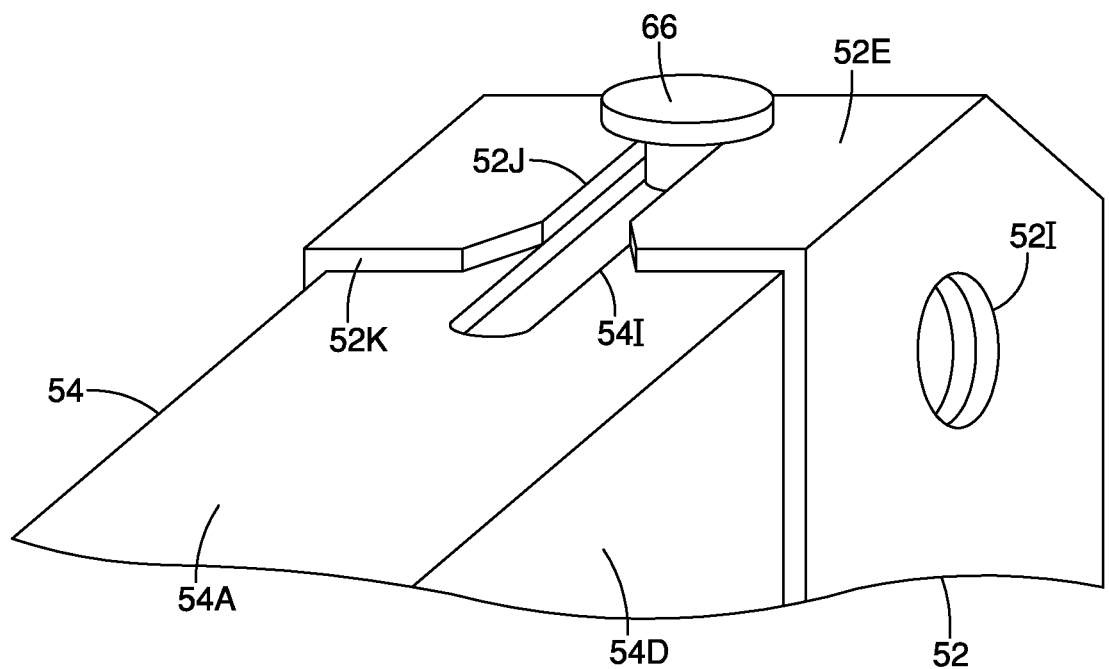
FIG. 7 is a perspective view of the locking member of FIG. 6 in a locked position such that the second beam member is locked to the first beam member.

A locking member 66 is movably disposed in the slot 54I of the second beam member 54, as shown in FIGS. 5-7. A head of the locking member 66 is larger than a width of the slot 54I, thereby preventing the locking member 66 from falling through the slot. A similar feature can be provided on an opposite end of the locking member 66 to prevent removal of the locking member 66 from the slot 54I.

The first and second openings 52H and 52I of the first beam member 52 are aligned with the first and second openings 54F and 54H of the second beam member 54 when the second beam member 54 is received by the first beam member 52, as shown in FIGS. 1-7. A third pin 64 is inserted through the aligned first and second openings 52H, 52I, 54F and 54H of the first and second beam members 52 and 54, thereby rotatably connecting the second beam member 54 to the first beam member 52. A first end of the third pin 64 has a head to prevent insertion of the pin through the first opening 52H in the first beam member 52. An opening can be disposed at an opposite end of the third pin 64 that receives a cotter pin, as shown in FIG. 5, to prevent removal of the third pin 64. Alternatively, the third pin 64 can be configured in any suitable manner to prevent removal of the third pin 64 from the first and second beam members 52 and 54.

As shown in FIG. 5, the upper wall 52E of the first beam member 52 limits rotation of the second beam member 54 relative to the first beam member 52 in a counter-clockwise direction. The rear wall 52F of the first beam member 52 limits rotation of the second beam member 54 relative to the first beam member 52 in a clockwise direction, as shown in FIG. 5. As shown in FIG. 5, the second beam member 54 is rotatable approximately 90 degrees relative to the first beam member 52. The angle of the upper wall 52E of the first beam member 52 can be configured to control the amount of rotation of the second beam member 54 relative to the first beam member 52.

The second beam member 54 is movable relative to the first beam member between a first position in which the second beam member 54 is disposed in the cavity 52G of the first beam member 52, as shown in FIGS. 1 and 3, and a second position in which the locking member 66 locks the second beam member 54 to the first beam member 52, as shown in FIGS. 6 and 7. The locking member 66 is configured to be received by the first and second beam members 52 and 54 to lock the second member 54 to the first beam member 52 to substantially prevent movement of the second beam member 54 with respect to the first beam member 52. When the second beam member 54 is in the second position, the locking member 66 is moved from a first end of the slot 54I shown in FIG. 6 to a second end of the slot 54I shown in FIG. 7. The notch 52J in the upper wall 52E of the first beam member 52 is aligned with the slot 54I in the second beam member 54, as shown in FIGS. 6 and 7, thereby facilitating movement of the locking member 66 through the slot 54I. In the locked position shown in FIG. 7, the upper and lower heads of the locking member 66 prevent rotational movement of the second beam member 54 relative to the first beam member 52.

A stored position of the sliding tool assembly 12 is shown in FIGS. 1 and 3. The second beam member 54 is disposed in the cavity 52G of the first beam member 54. To utilize the sliding tool assembly 12, the sliding member 48 is slid along the accessory track to a desired position. The base member 50 is rotated about the first rotation axis A1 to position the first beam member perpendicular to the floor 28 of the cargo area 18. As shown in FIG. 2, the first beam member 54 is disposed over the floor 28 of the cargo area 18. The first beam member 52 is then rotated 180 degrees about the second rotation axis A2 such that the cavity 52G of the first beam member moves to a position facing the second wall structure 22, as shown in FIG. 2. The second beam member 54 is then rotated about the third rotation axis A3 to a position shown in FIG. 3 in which the second beam member 54 is substantially parallel to the floor 28 of the cargo area 28. The tightening members 58 and 62 can then be used to secure the base member 50 and the first beam member 52, respectively, in the desired positions. The locking member 66 is moved to the locked position shown in FIG. 7 to prevent rotation of the second beam member 54 relative to the first beam member 52.

As shown in FIG. 4, the first beam member 52 can be rotated relative to the base member 50 about the second rotation axis A2 approximately 180 degrees to a second position in which the second beam member 54 is not disposed over the floor 28 of the cargo area 18. In a view looking down on the vehicle of FIG. 2, the second beam member 54 is disposed over the floor 28 of the cargo area 18. In a view looking down on the vehicle of FIG. 4, a portion of the second beam member 54 is not disposed over the floor 28 of the cargo area 18. Movement of the first beam member 52 between a first position (FIG. 2) and the second position (FIG. 4) about the second rotation axis A2 allows the sliding tool assembly 12 to move an item between the vehicle 10 and an exterior of the vehicle 10.

To return the sliding tool assembly 12 to the stored position shown in FIG. 3, the locking member 66 is moved from the locked position (FIG. 7) to the unlocked position (FIG. 6). The second beam member 54 can then be rotated into the cavity 52G of the first beam member 52 to collapse the sliding tool assembly 12, thereby reducing the size of the collapsed sliding tool assembly 12. The first beam member 52 can then be rotated to a position in which the cavity 52G faces the inboard surface 16 of the first side wall structure 14, when the first beam member 52 is not already in such position. The base member 50 can then be rotated approximately 90 degrees toward the floor 28 of the cargo area 18 to position the sliding tool assembly 12 in the stored position shown in FIG. 3. The sliding tool assembly 12 is collapsed to a storage position substantially reducing the amount of space required for storage.

Figure 8:
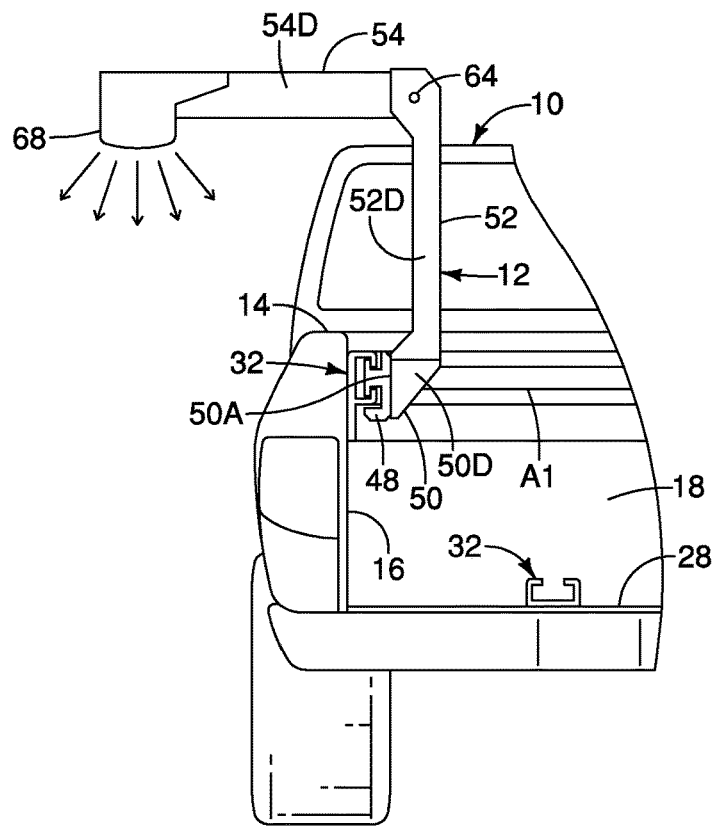
FIG. 8 is a perspective view of a light accessory connected to the second beam member of the sliding tool assembly of FIG. 1.
Figure 9:
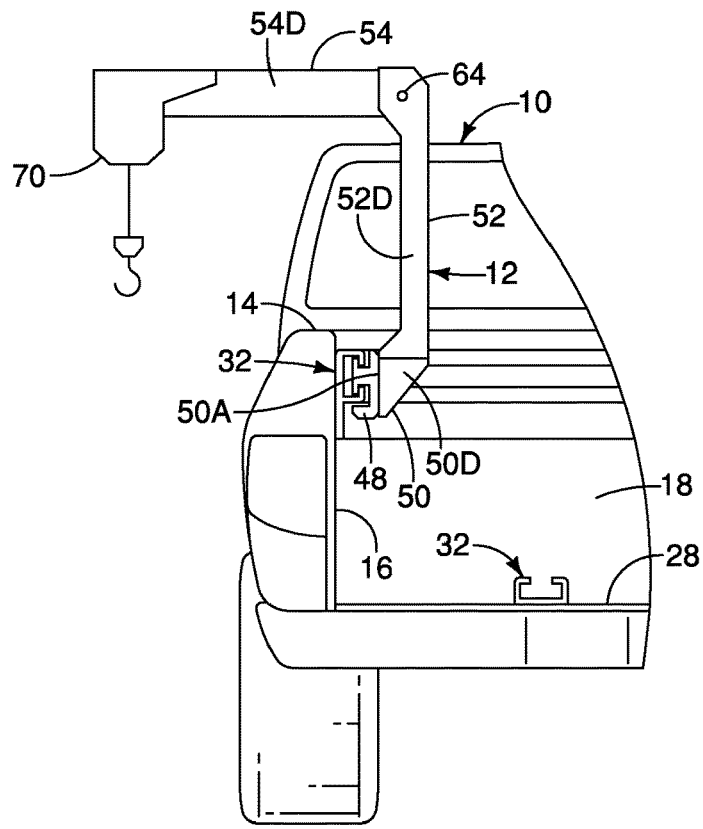
FIG. 9 is a perspective view of a pulley accessory connected to the second beam member of the sliding tool assembly of FIG. 1.

As shown in FIGS. 8 and 9, an accessory tool is removably attached to the second beam member 54. The accessory tool can be removably attached to the second beam member 54 in any suitable manner. The lower wall 54B of the second beam member 54 is preferably longer than the upper wall 54A, as shown in FIG. 5, to provide support for the connected accessory tool. As shown in FIG. 8, the accessory tool is a light 68 to facilitate lighting a desired area in the vicinity of the vehicle 10. As shown in FIG. 9, the accessory tool is a lifting tool 70, such as a pulley, to facilitate lifting heavy loads between the floor 28 of the cargo area 18 and an exterior of the vehicle 10.

A modified sliding tool assembly 12 is shown in FIG. 10. A set screw 72 is received by an opening in the rear wall 50A of the base member 50. When the base member 50 is in a desired position, the set screw 72 is rotated to engage the base portion 48C of the sliding member 48, thereby substantially preventing rotation of the base member 50 relative to the sliding member 48.

Figure 11:
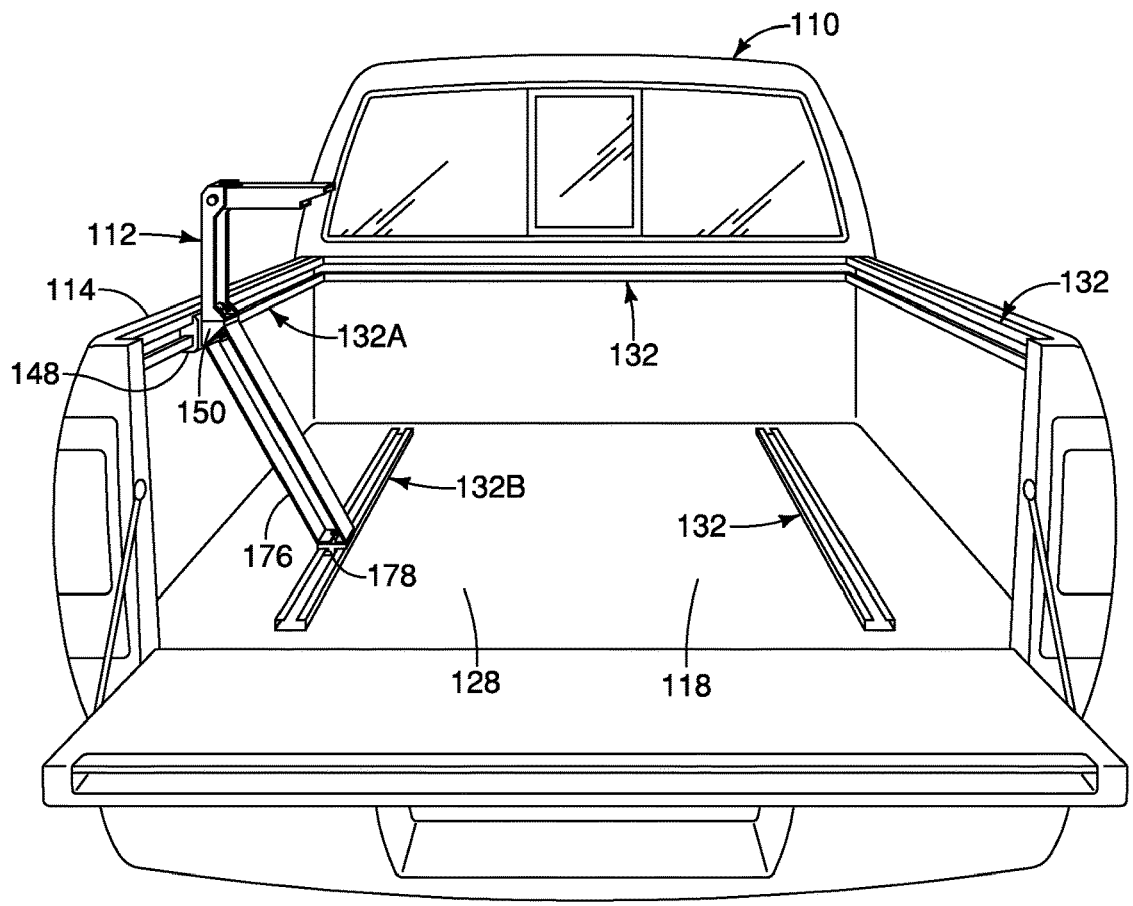
FIG. 11 is a rear perspective view of a sliding tool assembly including a support member connected to another accessory track of the vehicle.
Figure 12:
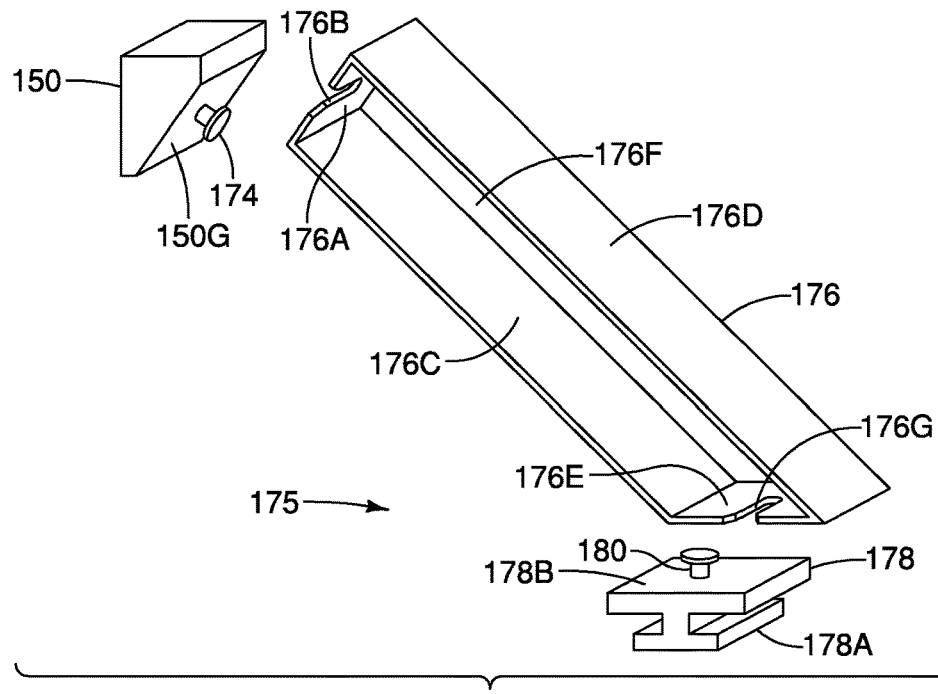
FIG. 12 is an exploded perspective view of the support member of FIG. 11.

Another exemplary embodiment of the sliding tool assembly 112 is shown in FIGS. 11 and 12. The features of the sliding tool assembly 112 of FIGS. 11 and 12 that are substantially similar to the features of the sliding tool assembly 12 of FIGS. 1-10 are provided the same reference numerals as the features of the sliding tool assembly 12. Moreover, the descriptions of the parts of the sliding tool assembly 112 of FIGS. 11 and 12 that are identical to the sliding tool assembly 12 of FIGS. 1-10 are omitted for the sake of brevity.

The sliding member 148 is configured to be slidably connected to a second accessory track 132 of the vehicle, as shown in FIGS. 11 and 12. The sliding member 148 is directly connected to the first accessory track 132A. A support assembly 175 extends between the base member 150 and the second accessory track 132B. The first accessory track 132A is connected to the first side wall structure 114 and the second accessory track 132B is connected to the floor 128 of the cargo area 118. In other words, the first and second accessory tracks 132A and 132B are connected to different wall structures of the vehicle body structure.

The support assembly 175 includes a support member 176 and a support sliding member 178. The support member 176 is connected to the base member 150. The support sliding member 178 is slidably connected to the second accessory track 132B.

The support member 176 is non-rotatably connected to the base member 150, as shown in FIG. 12. The support member 176 has an upper wall 176A having a first pin receiving notch 176B that receives a first support pin 174. The first support pin 174 extends outwardly from a front surface 150G of the base member 150. The first pin receiving notch 176B extends inwardly from an edge of the upper wall 176A. A head of the first support pin 174 is larger than a width of the first pin receiving notch 176B to prevent accidental separation of the support member 176 from the base member 150.

First and second side walls 176C and 176D extend from the upper wall 176A to a lower wall 176E. A rear wall 176F extends from the upper wall 176A to the lower wall 176E between the first and second side walls 176C and 176D. The lower wall 176E includes a second pin receiving notch 176G. The second pin receiving notch 176G extends inwardly from an edge of the lower wall 176E. Preferably, the first and second pin receiving notches extend from edges on the same side of the support member 176, as shown in FIG. 12.

The support sliding member 178 has an engagement portion 178A that is configured to be received by the cavity of the second accessory track 132B, as shown in FIG. 11. A base portion 178B is disposed externally of the second accessory track 132B. A second support pin 180 extends outwardly from the base portion 178B of the support sliding member 178.

The second support pin 178 is received by the second pin receiving notch 176G of the support member 176. The upper wall 176A and the lower wall 176E of the support member 176 are preferably not parallel to one another to facilitate the support member 176 extending between the first and second accessory tracks 132A and 132B, as shown in FIGS. 11 and 12. The sliding tool assembly 112 is provided with increased stability and can accommodate heavier loads by securing the sliding member to first and second accessory tracks 132A and 132B connected to different wall structures.

Figure 13:
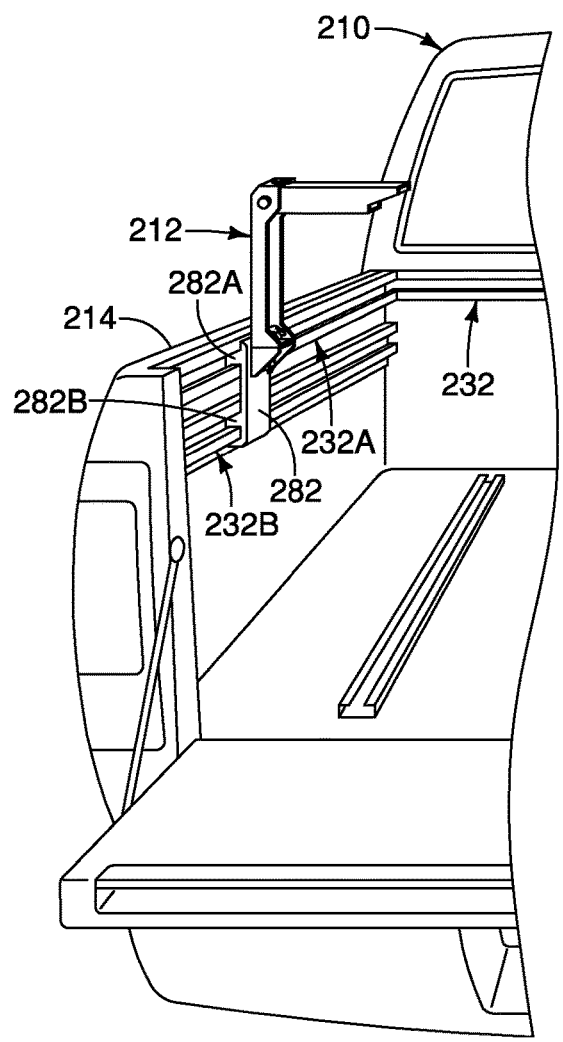
FIG. 13 is a perspective view of a sliding tool assembly including a sliding member connected to first and second accessory tracks.

Another exemplary embodiment of the sliding tool assembly 212 is shown in FIG. 13. The features of the sliding tool assembly 212 of FIG. 13 that are substantially similar to the features of the sliding tool assembly 12 of FIGS. 1-10 are provided the same reference numerals as the features of the sliding tool assembly 12. Moreover, the descriptions of the parts of the sliding tool assembly 212 of FIG. 13 that are identical to the sliding tool assembly 12 of FIGS. 1-10 are omitted for the sake of brevity.

The sliding member 182 has a first engagement portion 182A and a second engagement portion 182B configured to slidably engage first and second accessory tracks 132A and 132B, respectively, as shown in FIG. 13. The first accessory track 132A is disposed above the second accessory track 132B on the first side wall structure 214. In other words, the first and second accessory tracks 132A and 132B are connected to the same side wall structure. The sliding tool assembly 212 is provided with increased stability and can accommodate heavier loads by securing the sliding member to first and second accessory tracks 132A and 132B connected to the same wall structure.

Figure 14:
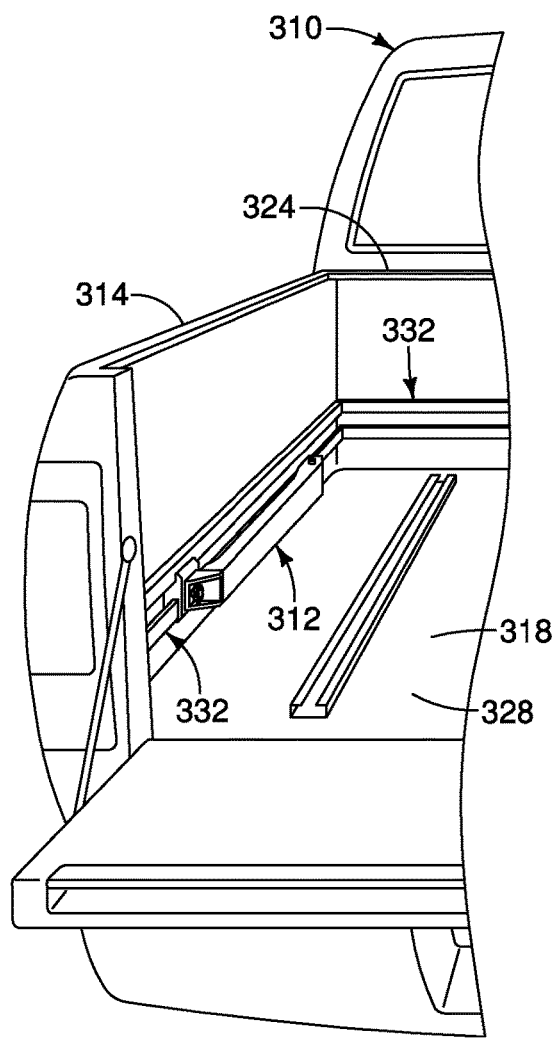
FIG. 14 is a perspective view of a vehicle including sliding tool assembly in which an accessory track is disposed at a lower end of a side wall structure.

Another exemplary embodiment of the sliding tool assembly 312 is shown in FIG. 14. The features of the sliding tool assembly 312 of FIG. 13 that are substantially similar to the features of the sliding tool assembly 12 of FIGS. 1-10 are provided the same reference numerals as the features of the sliding tool assembly 12. Moreover, the descriptions of the parts of the sliding tool assembly 312 of FIG. 14 that are identical to the sliding tool assembly 12 of FIGS. 1-10 are omitted for the sake of brevity.

The accessory tracks 332 connected to the front wall structure 324 and to the side wall structures (only the first side wall structure 314 is shown in FIG. 14) are disposed proximate to the floor, or lower wall structure, 328 of the cargo area 318.

Figure 15:
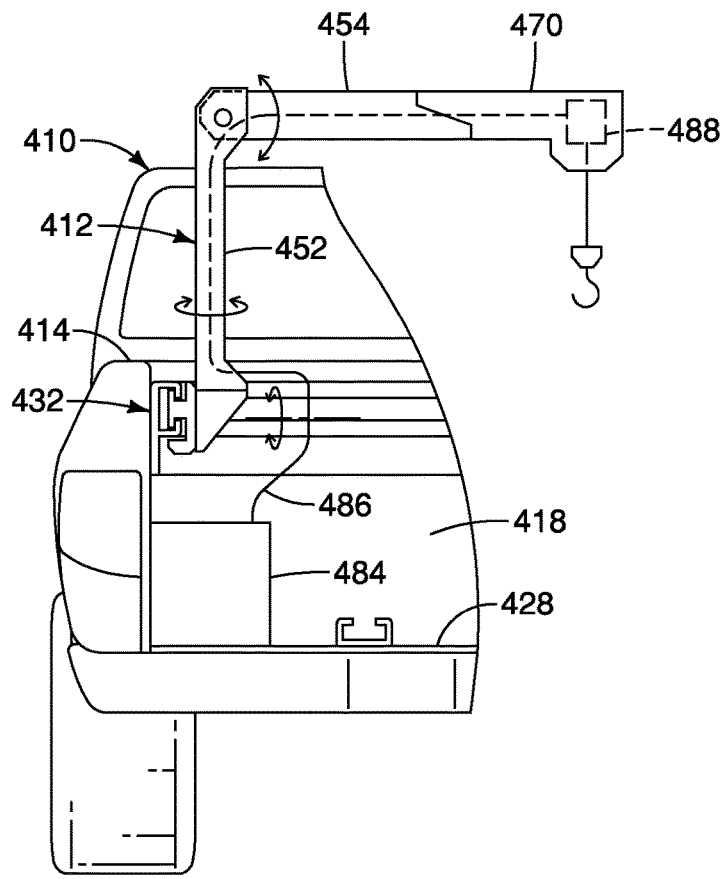
FIG. 15 is a rear elevational view of the sliding tool assembly of FIG. 1 including an external power source to power an attached accessory.

Another exemplary embodiment of the sliding tool assembly 412 is shown in FIG. 15. The features of the sliding tool assembly 412 of FIG. 15 that are substantially similar to the features of the sliding tool assembly 12 of FIGS. 1-10 are provided the same reference numerals as the features of the sliding tool assembly 12. Moreover, the descriptions of the parts of the sliding tool assembly 412 of FIG. 15 that are identical to the sliding tool assembly 12 of FIGS. 1-10 are omitted for the sake of brevity.

A power source 484 can be provided to supply power to operate an accessory tool, such as a pulley 470, connected to the sliding tool assembly 412, as shown in FIG. 15. Alternatively, the power source 484 can supply power to move the sliding tool assembly 412 along the accessory track 432 connected to the first side wall structure 414. The power source 484 can be any suitable power source, such as an electric motor, a hydraulic actuator or a pneumatic actuator.

As shown in FIG. 15, the power source 484 is disposed on the floor 428 of the cargo area 418 of the vehicle 410. An electrical wire 486 electrically connects the power source 484 to an electrical motor 488 of the pulley 470. The electrical wire 486 can be run through the cavities of the first and second beam members 452 and 454 to the motor 488 of the pulley 470.

Another exemplary embodiment of the sliding tool assembly is shown in FIG. 16. The features of the sliding tool assembly of FIG. 16 that are substantially similar to the features of the sliding tool assembly 12 of FIGS. 1-10 are provided the same reference numerals as the features of the sliding tool assembly 12. Moreover, the descriptions of the parts of the sliding tool assembly of FIG. 16 that are identical to the sliding tool assembly 12 of FIGS. 1-10 are omitted for the sake of brevity.

The accessory track 532 can be provided with plurality of upper recesses 540A in the upper outer wall 540 and a plurality of lower recesses 542A formed in the lower outer wall 542, as shown in FIG. 16. The upper and lower recesses 540A and 540B are aligned and provide predetermined positions in which a sliding member 548 of the sliding tool assembly can be secured.

A clamping member 590 is movably received by the sliding member 548. The clamping member 590 is configured to engage the accessory track 532. A tightening member 558 movably receives the clamping member 590. An indicator 592 is fixed to the clamping member 590 and movable with the clamping member 590 to indicate a position thereof.

The clamping member 590 includes a clamping portion 590A and shaft portion 590B. The shaft portion 590B extends outwardly from the clamping portion 590A and has a non-threaded portion and a threaded portion. The shaft portion 590B is preferably fixed to the clamping portion 590A. The clamping portion 590A has a width less than a length thereof. The width of the clamping portion 590A is preferably approximately equal to or slightly less than the width W of the slot 44 (FIG. 5) of the accessory track 532. The length of the clamping portion 590A is greater than the width of the slot of the accessory track 532.

A nut 592 is fixedly retained in the tightening member 558. The shaft portion 590B of the clamping member 590 is inserted through an opening 548A in the sliding member 548 and an opening in the base member 550. The indicator 592 is disposed on the shaft portion 590B of the clamping member 590. The indicator opening 592A corresponds to the shaft portion 590B of the clamping member 590 such that the indicator can rotate with the clamping member 590. The nut 592 receives the threaded portion of the shaft portion 590B of the clamping member 590. The indicator 592 is received by the threaded portion of the shaft portion 590B and is received between the base member 550 and the nut 592.

The tightening member 558 rotates the clamping member 590 between a position in which lobes of the clamping portion 590A engage the recesses 540A and 542A, thereby preventing movement of the sliding member 548 with respect to the accessory track 532. The indicator 592 is disposed in a first position, such as a vertical position, indicating that the sliding member 548 is in a locked position. The tightening member 558 can then be rotated to rotate the clamping member 590 such that the lobes of the clamping portion 590A disengage the recesses 540A and 542A, thereby allowing movement of the sliding member 548 with respect to the accessory track 532. The indicator 592 is disposed in a second position, such as a horizontal position, indicating that the sliding member 548 is in an unlocked position and can be moved along the accessory track 532.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the sliding tool assembly. Accordingly, these terms, as utilized to describe the present invention should be interpreted relative to a vehicle equipped with the sliding tool assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A sliding tool assembly, comprising:
a sliding member configured to be slidably connected to a first accessory track of a vehicle, the sliding member including a support portion connected to a lower end of the sliding member and configured to extend beneath the first accessory track when the sliding member is connected to the first accessory track, the support portion extending substantially perpendicularly to a sliding direction of the sliding member;
a base member rotatably connected to the sliding member and rotatable about a first rotation axis, the first rotation axis being configured to extend through the first accessory track;
a first beam member rotatably connected to the base member and rotatable about a second rotation axis;
a second beam member rotatably connected to the first beam member and rotatable about a third rotation axis, the third rotation axis intersecting the second rotation axis; and
a pin extending outwardly from the sliding member and rotatably receiving the base member, the pin defining the first rotation axis, the base member being configured to rotate relative to the sliding member when the sliding member is connected to the first accessory track,
the first beam member having a cavity configured to receive the second beam member to facilitate collapsing the sliding tool assembly for storage, and
the base member being configured to be rotatable to a position in which the first beam member is parallel to the first accessory track with the second beam member disposed in the cavity of the first beam member.

2. The sliding tool assembly according to claim 1, wherein the first, second and third rotation axes are different axes.

3. The sliding tool assembly according to claim 1, wherein an accessory tool is removably attachable to the second beam member.

4. The sliding tool assembly according to claim 3, wherein the accessory tool is a light.

5. The sliding tool assembly according to claim 3, wherein the accessory tool is a lifting tool.

6. The sliding tool assembly according to claim 1, wherein the first rotation axis is substantially perpendicular to the second rotation axis.

7. The sliding tool assembly according to claim 1, wherein the third rotation axis is substantially perpendicular to the second rotation axis.

8. The sliding tool assembly according to claim 1, wherein the sliding member is configured to be slidably connected to a second accessory track of the vehicle.

9. The sliding tool assembly according to claim 1, wherein a locking member is configured to be received by the first and second beam members to lock the second beam member to the first beam member to substantially prevent movement of the second beam member with respect to the first beam member.

10. A sliding tool assembly for a vehicle, comprising:
a vehicle body structure;
a first accessory track connected to the vehicle body structure;
a sliding member slidably connected to the first accessory track, the sliding member including a support portion connected to a lower end of the sliding member and extending beneath the first accessory track, the support portion extending substantially perpendicularly to a sliding direction of the sliding member;
a base member rotatably connected to the sliding member and rotatable about a first rotation axis, the first rotation axis extending through the first accessory track;
a first beam member rotatably connected to the base member and rotatable about a second rotation axis; and
a second beam member rotatably connected to the first beam member and rotatable about a third rotation axis, the third rotation axis intersecting the second rotation axis; and
a pin extending outwardly from the sliding member and rotatably receiving the base member, the pin defining the first rotation axis, the base member being configured to rotate relative to the sliding member when the sliding member is connected to the first accessory track,
the base member being configured to be rotatable toward the body structure, and the second beam member being configured to be rotatable into a cavity of the first beam member to collapse the sliding tool assembly, and
the base member being configured to be rotatable to a position in which the first beam member is parallel to the first accessory track with the second beam member disposed in the cavity of the first beam member.

11. The sliding tool assembly of claim 10, wherein an accessory tool is configured to be removably attached to the second beam member.

12. The sliding tool assembly of claim 11, wherein a power source connected to the accessory tool powers the accessory tool.

13. The sliding tool assembly of claim 10, wherein the first beam member is rotatable between a first position in which the second beam member is disposed over the body structure and a second position in which the second beam member is not disposed over the body structure when looking down on the vehicle.

14. The sliding tool assembly of claim 10, wherein the sliding member is configured to be slidably connected to a second accessory track of the vehicle.

15. The sliding tool assembly of claim 14, wherein the first and second accessory tracks are connected to a same side wall structure.

16. The sliding tool assembly of claim 14, wherein the first accessory track is connected to a side wall structure, and the second accessory track is connected to a lower wall structure.

17. The sliding tool assembly of claim 16, wherein a support assembly extends between the base member and the second accessory track.

18. The sliding tool assembly of claim 10, wherein a locking member is configured to be received by the first and second beam members to lock the second beam member to the first beam member to substantially prevent movement of the second beam member with respect to the first beam member.

* * * * *